March 6, 1934.  J. DE LA CIERVA  1,949,410
AIRCRAFT SUSTAINING ROTOR
Filed Feb. 5, 1932  3 Sheets-Sheet 1
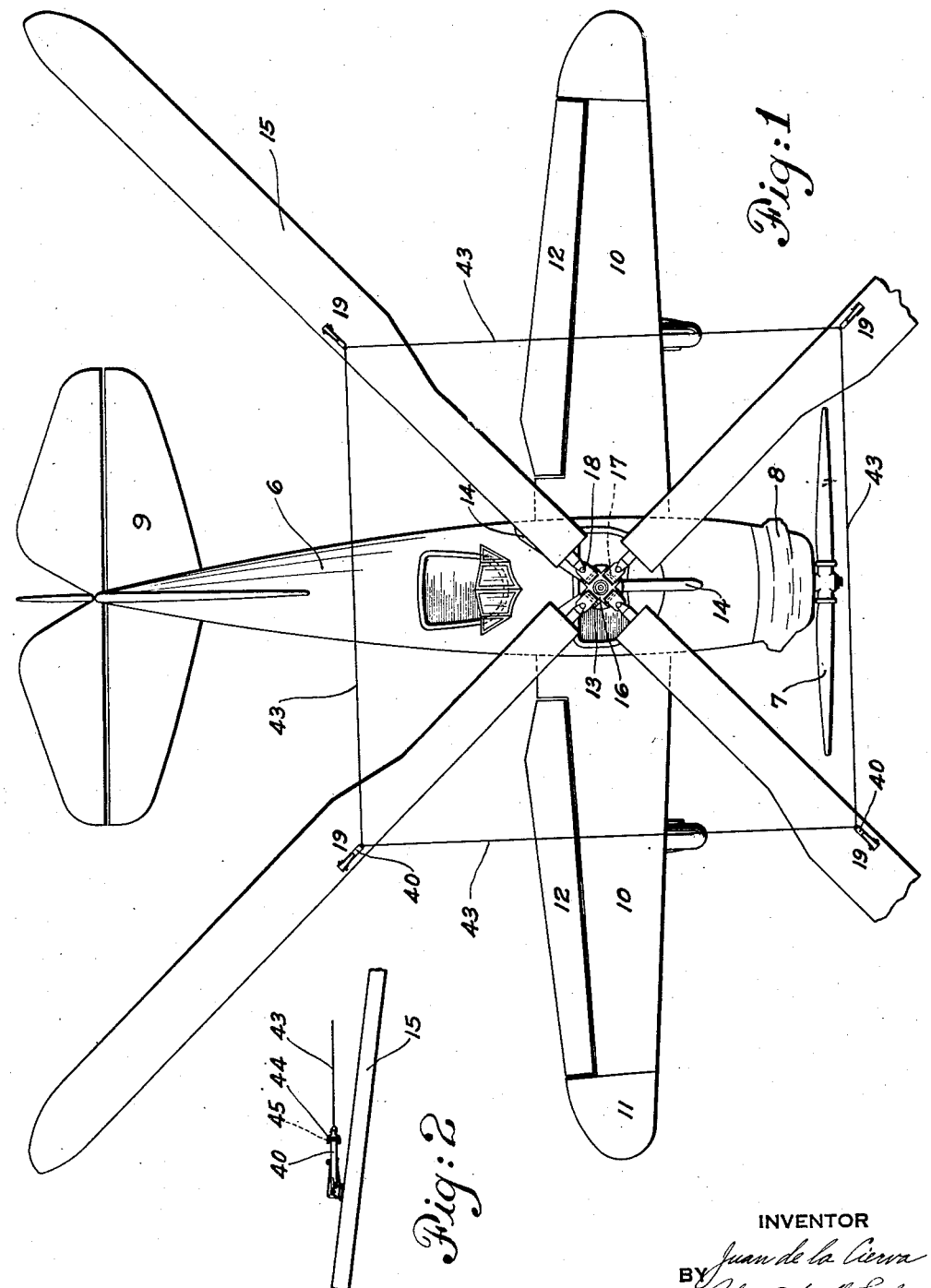
INVENTOR
Juan de la Cierva
BY
ATTORNEYS

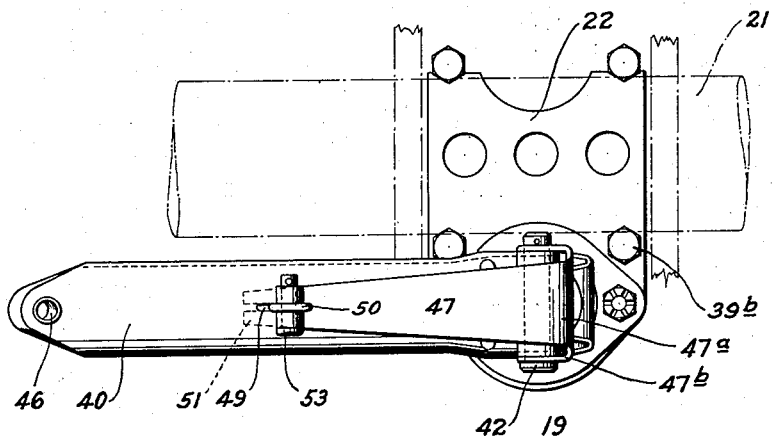
Fig: 3
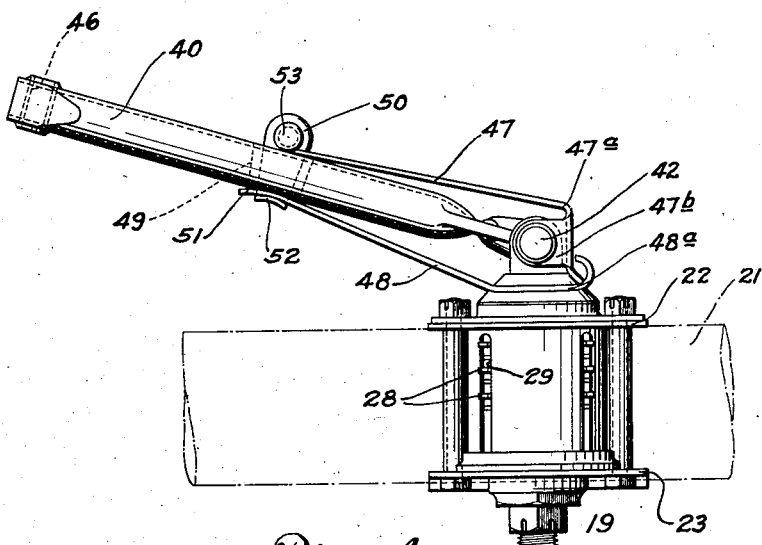
Fig: 4.

Patented Mar. 6, 1934

1,949,410

UNITED STATES PATENT OFFICE

1,949,410

AIRCRAFT SUSTAINING ROTOR

Juan de la Cierva, Madrid, Spain, assignor to Autogiro Company of America, Philadelphia, Pa., a corporation of Delaware Application February 5, 1932, Serial No. 591,095

16 Claims. (Cl. 244—19)

This invention relates to aircraft sustaining rotors, especially to that type of rotor which includes a plurality of sustaining blades mounted for rotation about a common substantially vertically disposed axis, for individual upward and downward swinging movements and for individual movements within the general path of rotative travel.

In an aircraft of this general type, it is desirable, at least under certain conditions, to provide for control of the individual blade movements and the present invention, generally considered, has reference to a novel and highly efficient type of mechanism for accomplishing such control.

To consider the nature of the subject matter presented herein somewhat more specifically, it should first be noted that during normal flight operation, the blades of a rotor system of the type above defined cone upwardly from their points of attachment to the common axis structure. The blades, moreover, swing upwardly and downwardly as well as within their general path of rotative travel as a result of variations in normal flight forces.

As above noted, the present invention has specific reference to a means for controlling certain individual blade movements, the said means being particularly arranged for the control of individual blade movements within their general path of rotative travel. Devices intended to accomplish this general purpose are disclosed, for example, in my copending application, Serial No. 416,356, filed December 26th, 1929. This invention contemplates certain improvements over structures of the type disclosed in the said copending application.

With the foregoing in mind, it is noted that this invention provides for a rotationally operating blade movement damping or control device associated with each of the several rotor blades. For purposes of operation, each control device is provided with a lever or arm, preferably extended generally radially inwardly from the device toward the rotor axis, and the several operating levers are interconnected by means of cables or the like. In accordance with this invention, furthermore, each one of these arms is pivotally associated with its respective control device, the pivot preferably including a substantially horizontal axis of rotation. In this way, as the blades cone upwardly during normal flight operation or swing upwardly and downwardly as a result of variations in flight forces, the rotationally operating control device is relieved of all but rotative stresses, since the operating levers or members are free to swing upwardly or downwardly and thus compensate for the different angular positions which the several devices may take with respect to each other.

It is also an object of the present invention to provide means yieldingly tending to maintain each of the operating members for the control devices extended within a plane substantially perpendicular to the rotor axis, when the blades are in their normal "coned" position. The manner in which this is accomplished as well as additional advantages incident to such an arrangement will be more apparent as this description proceeds.

In addition to the foregoing, the present invention has in view providing a novel type of non-reactive or non-rebounding damping device, the said device including concentrically and coaxially arranged parts such as friction discs and relatively rotatable members operatively associated with the discs, whereby relatively great frictional resistance may be obtained by the use of parts which are not only of small overall dimensions and weight but which, in addition, are very compactly arranged. It is a further object to employ a relatively small housing or casing for various parts of the damper as well as to construct the housing in such manner as to provide a reservoir therein for lubricant for the relatively rotatable operating parts of the device.

Still further, this invention has in view the provision of mounting means for a control device of the character referred to, the said means being arranged so that the control device may be mounted substantially within the blade surfacing with the axis of relative rotation of the operating parts extended substantially parallel to the axis of the rotor itself when the blades are extended substantially perpendicularly therefrom. Stated in another way, the mounting structure of this invention provides for the extension of the axis between the relatively rotatable operating parts perpendicularly with respect to the general path of travel of a blade even though the aerofoil section of the blade be set at an angle to a plane perpendicular to the axis of rotation, for example, in the manner disclosed in my copending application, Serial No. 500,064, filed December 4th, 1930.

How the foregoing, together with other objects and advantages, are obtained will be more apparent from a consideration of the following description making reference to the accompanying drawings, in which Figure 1 is a somewhat diagrammatic top plan view of an aircraft of the general type to which this invention relates, this craft being equipped with the blade movement control mechanism of this invention;

Figure 2 is a somewhat enlarged side elevational view of a portion of one of the blades appearing in Figure 1, with various parts of the control mechanism illustrated as applied thereto;

Figure 3 is a still further enlarged top plan view of a portion of the controlling mechanism, this view also including a fragmentary showing of a blade structural element on which the mechanism may be mounted;

Figure 4 is a side elevational view of the structure shown in Figure 3; and

Figure 5:
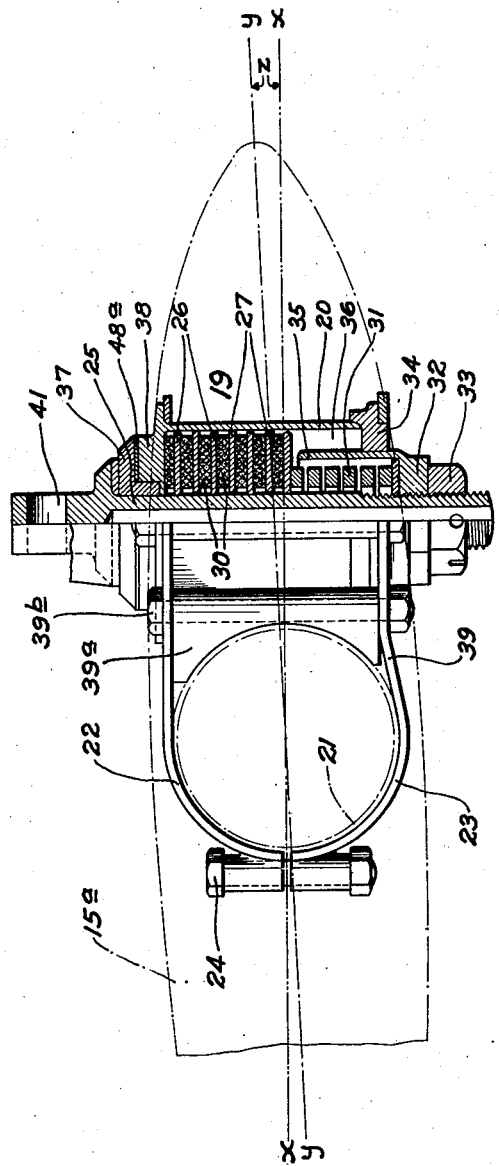
Figure 5 is an enlarged view, partly in vertical section and partly in elevation, of the mechanism shown in Figures 3 and 4.

Making reference first to Figure 1, the craft illustrated includes a body portion 6 having a propeller 7 and an engine 8 at the forward end thereof and an empennage structure 9 toward the rear end thereof.

Supplemental fixed lifting surfaces 10—10 are extended laterally at opposite sides of the craft and are provided with upturned tips 11—11. The fixed surfaces 10—10 also carry aileron surfaces 12—12.

The rotor system here shown is mounted above a cockpit 13 of the craft as by means of a pylon structure including leg elements 14. This rotor system includes a plurality of blades or wings 15 which are mounted for rotation about the axis structure indicated generally at 16. Each blade 15 is pivoted to the axis structure on a horizontally extended pivot pin 17 and a vertically extended pivot pin 18, so that the blades are free independently to assume various positions of equilibrium under the influence of different flight forces as well as variations thereof.

The blade movement controlling mechanism is here shown as applied to the blades in such manner as to yieldingly restrain individual blade movements about their substantially vertically extended pivot axes 18, and as best seen in Figures 3 to 5 inclusive, each blade is provided with a damping device generally indicated at 19.

Each damping device 19 includes a housing or casing part 20 which may be mounted or secured to a blade spar 21 by means of bracket members 22 and 23. These bracket members are apertured to receive the casing or housing 20 and extend laterally from the casing to partially embrace the spar 21 in the manner clearly illustrated in Figure 5. The casing 20, therefore, is positioned at one side of the spar 21 and, at the other side thereof, the adjacent and opposed edges or ends of the brackets 22 and 23 are secured to each other as by means of bolts 24.

An operating spindle or member 25 is journalled within the housing 20 and a plurality of friction discs or rings 26 are secured to the spindle 25 and arranged concentrically therearound. Complementary friction rings 27 are arranged alternately with the rings 26, the rings 27 being fixed within the casing 20 as by means of ears 28 (see Fig. 4) which project through vertically extended slots 29 formed in the casing wall. Friction washers or rings 30 are also preferably disposed between adjacent and relatively movable rings 26 and 27. The various rings just described are positioned toward the upper end of the casing 20 by means of a coil spring 31 which reacts against a cup member 32 threaded on to a lower portion of the central spindle 25. This cup member 32, in turn, is locked in its proper position by means of a nut 33 also threaded on to the central spindle 25. At its lower end the cylindrical portion of the housing 20 is provided with a ring or head 34 which serves to close the opening between the cylindrical wall 35 of the cup member 32 and the cylindrical wall of the casing itself. In this manner (see Fig. 5) a reservoir 36 is provided in which lubricant, preferably soft grease, may be packed, this material serving to lubricate the relatively movable surfaces of the parts 34 and 35.

At its upper end, the central spindle 25 is journalled within a bushing 37, the latter being fitted against the upper head 38 of the housing 20.

Before proceeding with a description of the operating parts which are associated with the various devices mounted on the several blades, attention is called to Figure 5 in which the blade surface 15a is indicated as being set, on the spar 21, at a positive angle of incidence. That is, the blade section is set at a positive angle with respect to the line x—x, this line being drawn to represent the general direction of movement of the blade or, in other words, to represent a plane perpendicular to the axis of rotation. The transverse axis of the blade section is here indicated by the line y—y and, bearing in mind that the direction of rotation is to the right, as viewed in Figure 5, it will be seen that the blade is set at a positive angle z. For reasons which will appear more fully hereinafter, it is desirable that the axis of relative rotation between the operating parts 20 and 25 of the control device 19 should be set perpendicularly with respect to the line x—x and with this in mind, I preferably construct at least one of the mounting brackets 22 and 23 with a portion or portions slightly deformed or irregular. Such an irregularity is illustrated at 39 in Figure 5 and from inspection of this figure it will be seen that the mounting brackets arranged in the manner just indicated provide not only for extension of the axis of the part 25 vertically with respect to the line x—x but at the same time provide for disposition of substantially the entire control device 19 within the blade surfacing 15a. A bracket spacing member 39a and additional bolts 39b are also employed to ensure attachment of the device 19 at the proper angle.

Referring now more particularly to Figures 3 and 4, each of the control devices 19 is provided with an operating lever or member 40 which is extended generally laterally therefrom and pivotally joined to the operating part 25. In Figure 5 a substantially horizontal bore 41 is illustrated at the upper end of the part 25 and in Figures 3 and 4 the lever 40 is shown as being joined to the part 25 by means of a pivot pin 42 which is extended through the bore 41. The lever 40, therefore, may swing upwardly and downwardly with respect to its associated control device 19.

As seen in Figures 1 and 2, the levers 40 for the various control devices are extended generally inwardly toward the axis structure 16 and are interconnected by means of cables or wires 43. For the purpose of attaching the cables 43 to the arms 40, I prefer to employ forked clip members 44 (see Fig. 2) which are pivotally connected to the levers by pins 45 extended vertically through similarly arranged apertures 46 at the free ends of the levers 40 (see Figs. 3 and 4).

The construction above described thus provides for swinging movement of the operating members 40 as the blades swing upwardly and downwardly on their horizontal articulations 17.

In Figure 2 a portion of a blade 15 is illustrated in a somewhat upwardly angled position, for example, a position similar to that which the blade would occupy when "coned up" under the influence of normal flight forces. Under such circumstances, the operating lever 40 is extended in a plane substantially perpendicular to the axis of the rotor, so that the line of reaction from blade to blade is similarly extended and, indeed, is substantially direct between the points of attachment of the several operating arms to their associated control devices.

In addition to the features above described, and as best seen in Figures 3 and 4, the operating lever 40 for each one of the control devices is also provided with spring means associated therewith tending normally to angularly position each lever to provide for the direct line of reaction, in a single plane, from blade to blade in the manner referred to just above. In the embodiment herein disclosed, this spring means includes two spring devices 47 and 48 one arranged above and the other arranged below the lever 40. The spring 48 may conveniently be secured or mounted on the control device by means of an apertured portion thereof 48a which is engaged by the bushing 37. On the other hand, the spring 47 is preferably provided with a bent end portion 47a provided with apertured ears 47b through which the pivot pin 42 for the lever 40 is extended. The two springs are extended, one at each side of the lever 40, outwardly adjacent to a slot 49 through which a yoke or link 50 projects. The lower spring 48 has a bifurcated end portion 51 adapted to embrace the link 50 and be engaged by laterally extended ears 52 thereof, while the upper spring 47 has a portion bent around a pin 53 which is extended therethrough as well as through an opening in the upper end of the link 50. In this way freedom for relative sliding movement between the two springs and between the springs and the lever is provided for when the lever swings upwardly and downwardly about its horizontal pivot 42.

According to the foregoing, therefore, in addition to providing for freedom of movement of the operating arms upwardly and downwardly as the blades swing on their horizontal articulations, the construction, including the springs 47 and 48, provides for normally positioning the levers in such manner as to produce the most direct reaction between the several control devices of the rotor. Furthermore, it will be readily seen that the normal position of the several levers 40, toward which position said levers are urged by their springs, is such as to keep the inner blade cables normally out of contact with the surfaces of the blades, thereby preventing rubbing, wear and vibration.

Attention is also called to the fact that the bracket mounting means for the control devices are so constructed as to position the devices substantially completely within the blade surface or covering and, at the same time, so dispose the said devices within the blades that the axes of rotation between the operating parts thereof extend perpendicularly with respect to the general path of movement of the blades even though such blades be set at an angle with respect to a plane perpendicular to the central axis of rotation, for example, in the manner disclosed in my copending application, Serial No. 500,064 above referred to.

In addition to all the foregoing features, the present invention, as will now be apparent, makes provision for a neat and compact control device which may conveniently be disposed entirely within the blade surfacing or covering and thus reduce skin friction, parasite drag and the like to a minimum. The particular multiple friction disc arrangement of the control device, furthermore, provides for relatively high frictional resistance even though all the parts are of relatively small size. The device is further arranged for convenient and accurate adjustment to meet the requirements of craft of widely differing general characteristics.

What I claim is:—

1. In combination with an aircraft rotor including a sustaining blade mounted for rotation, for upward and downward swinging movements and for movements substantially within the general path of rotative travel, a mechanism for controlling the last mentioned blade movements, said mechanism including an operating device therefor arranged for control movements generally within the said path of travel, said device having a substantially horizontal pivot therein and being connected with another blade of the rotor as a point of reaction, together with said other blade.

2. In combination with a rotor system including a plurality of sustaining blades mounted for rotation about a common axis, for upward and downward swinging movements and for movements within their general path of rotative travel, in which construction the blades cone upwardly during normal flight operation, a mechanism for controlling the blade movements last mentioned including a control device mounted on one blade and connected with another, the connection including a member pivotally movable with respect to one of the blades on a substantially horizontally extended axis, together with means acting yieldingly to maintain said member in a position in which it extends substantially within a plane perpendicular to the rotor axis, in normal flight operation.

3. In combination with a pivotally and rotatively mounted aircraft sustaining blade set with its transverse axis at an angle to a plane perpendicular to the axis of rotation, a mechanism for controlling pivotal blade movements, said mechanism including a damping device having relatively rotatable parts, and means for mounting said device on the blade with the rotatable axis of said parts extended substantially parallel to the axis of rotation of the blade when the blade is extended perpendicularly therefrom.

4. In an aircraft having a sustaining rotor, an upwardly extended axis structure, a sustaining blade rotatable about the axis structure, pivoted thereto, and set at an angle with respect to a plane perpendicular to the axis thereof, and a rotationally acting device for controlling pivotal blade movements mounted on said blade with its axis substantially paralleling that of the rotor when the blade is extended perpendicularly therefrom, the rotor including a plurality of such blades with similarly arranged control devices, together with operating means for said devices extended therebetween.

5. In combination with a pivotally and rotatively mounted aircraft sustaining blade set with its transverse axis at an angle to a plane perpendicular to the axis of rotation, a mechanism for controlling pivotal blade movements, said mechanism including a damping device having relatively rotatable parts, and means for mounting said device substantially within the blade surfacing with the rotatable axis of said parts extended substantially parallel to the axis of rotation of the blade when the blade is extended perpendicularly therefrom.

6. In combination with a pivotally and rotatively mounted aircraft sustaining blade set at an angle to a plane perpendicular to the axis of rotation, a mechanism for controlling pivotal blade movements, said mechanism including a damping device having relatively rotatable parts, and means for mounting said device on the blade with the rotatable axis of said parts extended substantially parallel to the axis of rotation of the blade, when the blade is extended perpendicularly therefrom, said mounting means including bracket means engaging a blade structural element and configured to support the damping device substantially within the blade surfacing.

7. For an aircraft rotor having a swingingly and rotatively mounted sustaining blade, a mechanism for controlling blade swinging movements including a friction damping device having a plurality of interleaving discs therein.

8. For an aircraft rotor having a swingingly and rotatively mounted sustaining blade, a mechanism for controlling blade swinging movements including a friction damping device having a casing mounted on a structural element of the blade, an operating shaft journalled in said casing and a plurality of interleaving discs in frictional interengagement and arranged for reaction between said shaft and said casing.

9. For an aircraft rotor having a swingingly and rotatively mounted sustaining blade, a mechanism for controlling blade swinging movements including a friction damping device having a casing mounted on a structural element of the blade, an operating shaft journalled in said casing and a plurality of interleaving discs in frictional interengagement and arranged for reaction between said shaft and said casing, together with spring means in said casing arranged to urge said discs toward each other.

10. For an aircraft rotor having a swingingly and rotatively mounted sustaining blade, a mechanism for controlling blade swinging movements including a friction damping device having a casing mounted on a structural element of the blade, an operating shaft journalled in said casing and a plurality of interleaving discs in frictional interengagement and arranged for reaction between said shaft and said casing, together with means for adjusting said frictional interengagement.

11. In combination with a pivotally and rotatively mounted aircraft sustaining blade, a device for controlling blade movements including a housing, a shaft journalled in the housing and damping elements in said housing arranged around said shaft.

12. In combination with a pivotally and rotatively mounted aircraft sustaining blade, a device for controlling blade movements including a housing, a shaft journalled in the housing and damping elements in said housing arranged around said shaft, the housing having a reservoir therein for lubricant for the shaft journal.

13. In combination in an aircraft sustaining rotor, a plurality of sustaining blades movably mounted upon an axis and movable with respect to each other, means arranged to interposition the blades and control blade movements including flexible members extending between blades, and means tending to keep said flexible members spaced away from the blade surfaces.

14. For an aircraft having a swingingly and rotatively mounted sustaining blade, a mechanism for controlling blade swinging movements including a rotationally acting device having a casing mounted on the blade, an operating member journaled in said casing and an arm for rotating said member, said arm being connected with said member on a substantially horizontally extended pivot.

15. For an aircraft having a swingingly and rotatively mounted sustaining blade, a mechanism for controlling blade swinging movements including a rotationally acting device having a casing mounted on the blade, an operating member journaled in said casing and an arm for rotating said member, said arm being connected with said member on a substantially horizontally extended pivot, together with spring means arranged to yieldingly maintain said arm on its pivot, substantially in its normal operating position.

16. In combination, a member mounted for movement in two different planes, means for controlling movement of the member in one of said planes which includes a rotationally acting movement damping device having an axis member, and a control member connected to said axis member for producing a rotational movement upon movement of the first mentioned member in one plane, the connection of said control member to said axis member including a pivot the axis of which extends generally perpendicular to the other plane of movement of the first member to relieve said axis member of other than rotational stresses upon movement of the first mentioned member in said other plane.

JUAN DE LA CIERVA.